(12) United States Patent
Li

(10) Patent No.: US 10,938,058 B2
(45) Date of Patent: Mar. 2, 2021

(54) BATTERY CAPABLE OF BIDIRECTIONAL OUTPUT

(71) Applicant: Wenjie Li, Guangzhou (CN)

(72) Inventor: Wenjie Li, Guangzhou (CN)

( * ) Notice: Subject to any disclaimer, the term of this patent is extended or adjusted under 35 U.S.C. 154(b) by 432 days.

(21) Appl. No.: 15/910,036

(22) Filed: Mar. 2, 2018

(65) Prior Publication Data

US 2019/0165406 A1 May 30, 2019

(30) Foreign Application Priority Data

Nov. 29, 2017 (CN) .......................... 201721628445.X
Jan. 24, 2018 (CN) .......................... 201820118916.0

(51) Int. Cl.
| | |
|---|---|
| *H01M 10/04* | (2006.01) |
| *H01M 2/02* | (2006.01) |
| *H01M 2/04* | (2006.01) |
| *H01M 2/34* | (2006.01) |
| *H01M 10/42* | (2006.01) |
| *H01M 10/0525* | (2010.01) |
| *H01M 10/058* | (2010.01) |

(52) U.S. Cl.
CPC ....... *H01M 10/0422* (2013.01); *H01M 2/028* (2013.01); *H01M 2/0417* (2013.01); *H01M 2/342* (2013.01); *H01M 10/425* (2013.01); *H01M 10/4257* (2013.01); *H01M 10/058* (2013.01); *H01M 10/0525* (2013.01); *H01M 2010/4271* (2013.01); *H01M 2200/30* (2013.01)

(58) Field of Classification Search
CPC .......................... H01M 2/342; H01M 2200/30
See application file for complete search history.

(56) References Cited

U.S. PATENT DOCUMENTS

| | | | | |
|---|---|---|---|---|
| 5,104,752 A | * | 4/1992 | Baughman | H01M 2/30 429/1 |
| 5,709,964 A | * | 1/1998 | Christensen | H01M 2/105 429/153 |
| 7,910,239 B2 | * | 3/2011 | Kim | H01M 2/30 429/121 |

FOREIGN PATENT DOCUMENTS

| | | |
|---|---|---|
| CN | 202972575 U | 6/2013 |
| CN | 204991832 U | 1/2016 |
| CN | 205026435 U | 2/2016 |
| CN | 107388077 A | 11/2017 |

* cited by examiner

*Primary Examiner* — Brian R Ohara
(74) *Attorney, Agent, or Firm* — Schmeiser, Olsen & Watts, LLP

(57) ABSTRACT

For the battery capable of bidirectional output in the embodiments, the two ends of the battery are both provided with a battery anode and a battery cathode respectively, such that any end of the battery can provide an anode output terminal and a cathode output terminal simultaneously. Circuit wiring of the battery can be optimized during use, and the first end of the battery capable of bidirectional output is provided with a first battery anode which protrudes outwards, and the second end thereof is provided with a second battery cathode which protrudes outwards. The battery in has a structure which is similar to that of a common battery, thus the battery can be charged with a common charger, then short circuiting is prevented, and no charger needs to be specially designed.

10 Claims, 3 Drawing Sheets

BATTERY CAPABLE OF BIDIRECTIONAL OUTPUT

CROSS-REFERENCE TO RELATED APPLICATIONS

This application claims priority to Chinese Application No. CN 201721628445.X having a filing date of Nov. 29, 2017 and Chinese Application No. CN 201820118916.0 having a filing date of Jan. 24, 2018, the entire contents both of which are hereby incorporated by reference.

FIELD OF TECHNOLOGY

The following relates to a battery, in particular to a battery capable of bidirectional output.

BACKGROUND

Cylindrical lithium batteries with unidirectional output in the related art are usually charged by corresponding cylindrical lithium battery chargers, for example, conventional chargers used for such cylindrical lithium batteries with such models as 21700, 20700 and 18650, wherein one end of each of the chargers is an anode terminal, while the other end is a cathode terminal. However, for a battery capable of bidirectional output in the related art, since the two ends of such a battery are both provided with a battery anode and a battery cathode, and the battery anode and the battery cathode are not specifically designed and suitable for common chargers, when the battery is connected to a common charger, the battery anode and the battery cathode may be in contact with an anode terminal or a cathode terminal at the same time, thereby easily causing short circuit, therefore, such a battery capable of bidirectional output usually needs to be charged with a specifically designed charger, which leads to inconvenience in use.

SUMMARY

An aspect relates to a battery with an anode output terminal and a cathode output terminal at the same time at both end and which can be charged by common chargers.

The following adopts the following technical solutions:

A battery capable of bidirectional output, comprising a battery core, a battery anode, a battery cathode and an insulating sleeve; wherein the battery core comprises a first end and a second end, an end part of the first end is provided with a core anode, and an end part of the second end is provided with a core cathode; the insulating sleeve is arranged outside the battery core in a sheathing manner, and two ends of the insulating sleeve are open; the battery anode comprises a first battery anode and a second battery anode, the battery cathode comprises a first battery cathode and a second battery cathode, the first battery anode and the first battery cathode are located at the first end of the battery core, and the second battery anode and the second battery cathode are located at the second end of the battery core; the battery anode is electrically connected with the core anode, and the battery cathode is electrically connected with the core cathode; and the first battery anode protrudes outwards with respect to the first battery cathode, and the second battery cathode protrudes outwards with respect to the second battery anode.

For the battery capable of bidirectional output in embodiments of the present invention, the two ends of the battery are both provided with a battery anode and a battery cathode respectively, such that any end of the battery can provide an anode output terminal and a cathode output terminal simultaneously, circuit wiring can be optimized during use, and the first end of the battery capable of bidirectional output is provided with a first battery anode which protrudes outwards, and the second end thereof is provided with a second battery cathode which protrudes outwards, the battery in embodiments of the present invention has a structure which is similar to that of a common battery, thus the battery can be charged with a common charger, then short circuit is prevented, and no charger needs to be specially designed.

Further, center of the first battery cathode is provided with a through hole, the first battery anode is located on an axis of the through hole of the first battery cathode, and protrudes outwards with respect to the first battery cathode; and the center of the second battery cathode is provided with a through hole, the second battery anode is located on an axis of the through hole of the second battery cathode, and is sunken with respect to the second battery cathode.

Further, the first battery anode is truncated-cone-shaped or cylinder-shaped, while the first battery cathode is annular, center of the first battery cathode is provided with a through hole, the first battery anode is located on an axis of the through hole of the first battery cathode, and protrudes outwards with respect to the first battery cathode; and the second battery anode is a round piece, the second battery cathode is annular, and center of the second battery cathode is provided with a through hole, and the second battery anode is located on an axis of the through hole of the second battery cathode, and is sunken with respect to the second battery cathode.

Further, a first insulating piece is further included, wherein the first insulating piece is fixed with the first battery anode and the first battery cathode respectively in order to isolate and insulate the first battery anode and the first battery cathode, and also to enable the first battery anode to protrude outwards with respect to the first battery cathode.

Further, a second insulating piece and an insulating base are further included, wherein the insulating base is fixed below the core cathode, and is fixed with the second battery anode; and the second insulating piece is fixed with the second battery anode and the second battery cathode respectively in order to isolate and insulate the second battery anode and the second battery cathode, and also to enable the second battery cathode to protrude outwards with respect to the second battery anode.

Further, a circuit board is further included, the circuit board is provided with a protection circuit module, and the protection circuit module is connected between the battery anode and the battery cathode to control the on and off of an electrical connection between the battery anode and the battery cathode; the battery anode, the protection circuit module and the core anode are electrically connected in a successive order, every two of the battery cathode, the core cathode and the protection circuit module are mutually electrically connected, or, every two of the battery anode, the core anode and the protection circuit module are mutually electrically connected, and the battery cathode, the protection circuit module and the core cathode are electrically connected in a successive order.

Further, an anode connecting piece and a cathode connecting piece which are fixed along an outer side of the battery core respectively are further included, wherein the circuit board is fixed at a second end of the battery core; the first battery anode is electrically connected with the core anode, and the second battery anode is electrically connected with the core anode via the anode connecting piece; and the first battery cathode is electrically connected with the protection circuit module via the cathode connecting piece, the second battery cathode is electrically connected with the protection circuit module, and the protection circuit module is electrically connected with the core cathode.

Further, the first battery anode is a truncated-cone-shaped or cylinder-shaped protrusion, and is fixed above the core anode; the annular first insulating piece is arranged outside the first battery anode in a sheathing manner, and an outer edge of the first insulating piece is provided with a sunken step; the first battery cathode is a annular piece, and is arranged on the step in a covering manner, such that the first battery cathode is lower than the first battery anode; a first end of the anode connecting piece is fixed between the first battery anode and the core anode, such that the first battery anode is electrically connected with the core anode; and a first end of the cathode connecting piece is fixed between the first battery cathode and the step.

Further, the second battery anode is a round piece, and is fixed in center below the insulating base; the circuit board is a annular piece, and is fixed below the insulating base, wherein the outer edge of the circuit board is fixed with the insulating base, while the inner edge of the circuit board is fixed with the second battery anode to enable the second battery anode to be electrically connected with the protection circuit module; the second insulating piece is annular, and is fixed below the second battery anode and the circuit board, the through hole in the center of the second insulating piece leads to a bottom surface of the second battery anode, so as to expose the second battery anode; the second battery cathode is a annular piece, the inner edge of the second battery cathode is fixed with the second insulating piece, while the outer edge of the second battery cathode is fixed with the circuit board and is electrically connected with the protection circuit module; the insulating base is provided with a through hole, a second end of the anode connecting piece penetrates the through hole on the insulating base, is fixed with the circuit board and is electrically connected with the protection circuit module; and a second end of the cathode connecting piece penetrates the through hole on the insulating base, is fixed with the circuit board, and is electrically connected with the protection circuit module.

Further, the protection circuit module comprises a first chip, a first resistor, a second resistor, a first capacitor, a first field effect transistor, a second field effect transistor, an EB+ port and an EB− port; wherein the first chip is an S-8261 Series chip, and a VDD pin of the first chip is electrically connected with a first end of the first resistor and a first end of the first capacitor respectively, a second end of the first resistor is electrically connected with the EB+ port and the core anode respectively, the core cathode is electrically connected with the EB− port and the VSS pin of the first chip respectively, and the core cathode and a second end of the first capacitor are both grounded; a DO pin of the first chip is electrically connected with a gate terminal of the first field effect transistor, a CO pin of the first chip is electrically connected with a gate terminal of the second field effect transistor, and a VW pin of the first chip is electrically connected with a first end of the second resistor; a source terminal of the first field effect transistor is connected with the core cathode, and the drain terminal of the first field effect transistor is connected with the drain terminal of the second field effect transistor; a source terminal of the second field effect transistor and a second end of the second resistor are electrically connected, and they are both electrically connected with the EB− port; the EB+ port is electrically connected with the first battery anode and the second battery anode respectively, and the EB− port is electrically connected with the first battery cathode and the second battery cathode respectively; and the battery core is a 21700 battery core.

BRIEF DESCRIPTION OF THE DRAWINGS

Some of the embodiments will be described in detail, with references to the following Figures, wherein like designations denote like members, wherein.

DETAILED DESCRIPTION

Embodiment 1

Figure 1:
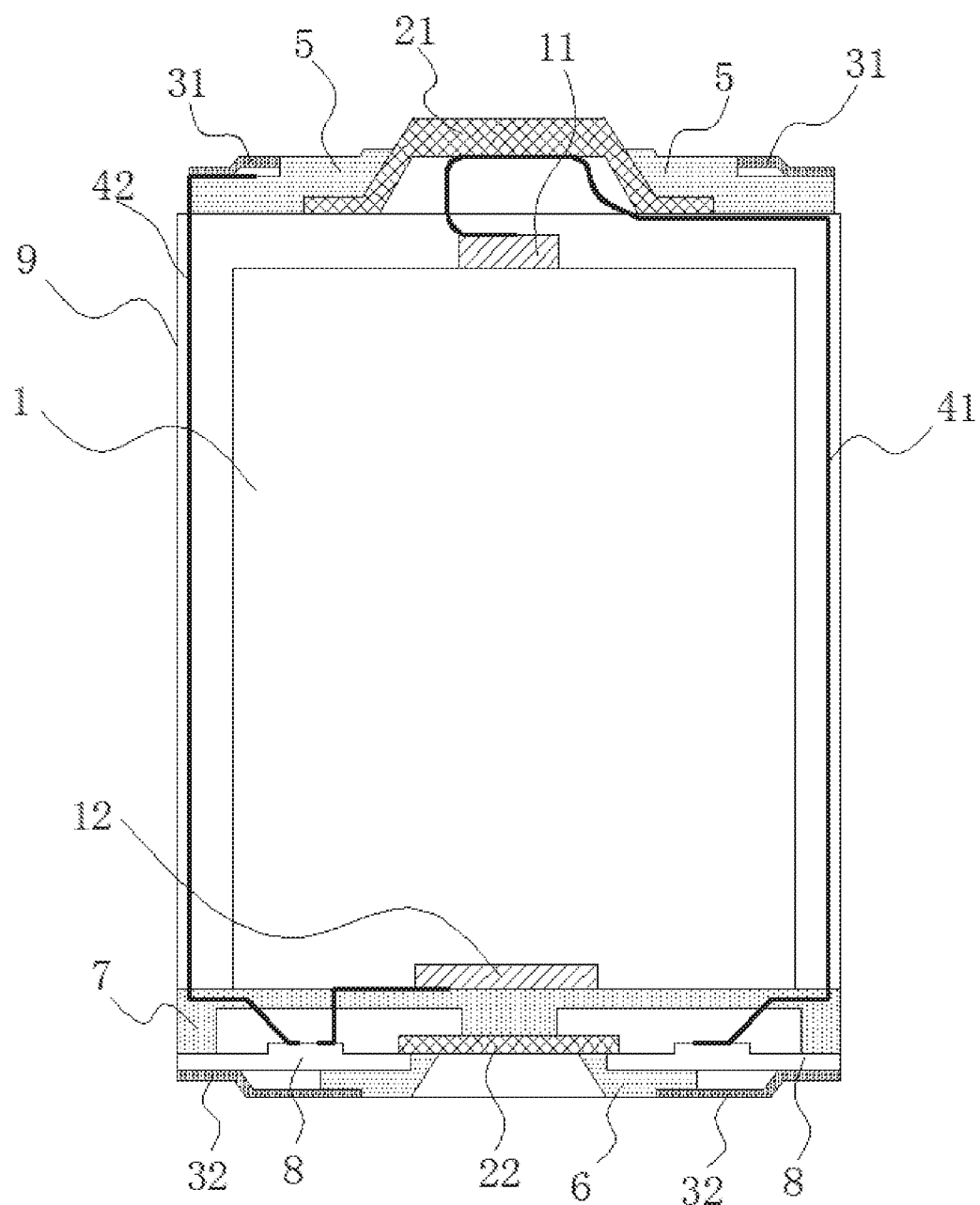
FIG. 1 is a structural schematic diagram of a battery capable of bidirectional output in a first embodiment of the present invention.

Please refer to FIG. 1. A battery capable of bidirectional output in a first embodiment of the present invention includes a battery core 1, a battery anode, a battery cathode, an anode connecting piece 41, a cathode connecting piece 42, a first insulating piece 5, a second insulating piece 6, an insulating base 7, a circuit board 8 and an insulating sleeve 9; the battery anode includes a first battery anode 21 and a second battery anode 22, and the battery cathode includes a first battery cathode 31 and a second battery cathode 32.

The battery core 1 is specifically a 21700 battery core, and includes a first end and a second end, wherein an end part of the first end is provided with a core anode 11, and an end part of the second end is provided with a core cathode 12.

The first battery anode 21 and the first battery cathode 31 are fixed at one end of the insulating sleeve 9 and arranged at the first end of the battery core 1 (namely, located close to the first end of the battery core), the second battery anode 22 and the second battery cathode 32 are fixed at the other end of the insulating sleeve 9 and arranged at the second end of the battery core 1 (namely, located close to the second end of the battery core). Specifically, the first battery anode 21 is a truncated-cone-shaped or cylindrical protrusion, and is fixed above the core anode 11; the annular first insulating sheet 5 is arranged outside the first battery anode 21 in a sheathing manner, and the outer edge of the first insulating sheet is provided with a sunken step; the first battery cathode 31 is an annular piece, and is arranged on the step in a covering manner, such that the first battery cathode is lower than the first battery anode 21. Therefore, a structure in which the first battery anode 21 protrudes outwards from the first battery cathode 31 is formed, or, the first battery cathode 31 is sunken inwards relative to the first battery anode 21, and the meanings expressed by the two statements are the same. The protruding structure of the first battery anode 21 ensures that when a common charger is used for charging, an anode interface of the charger will not be in contact with the first battery cathode 31 by mistake.

The insulating base 7 is fixed below the core cathode 12; the second battery anode 22 is a round piece, and is fixed in the center below the insulating base 7; the circuit board 8 is an annular piece, and is fixed below the insulating base 7, wherein the outer edge of the circuit board is fixed with the insulating base 7, while the inner edge thereof is fixed with the second battery anode 22 to enable the second battery anode 22 to be electrically connected with the protection circuit module; the second insulating piece 6 is annular, and is fixed below the second battery anode 22 and the circuit board 8, the through hole in the center of the second insulating piece leads to a bottom surface of the second battery anode 22, so as to expose the second battery anode 22; the second battery cathode 32 is a annular piece, the inner edge of the second battery cathode is fixed with the second insulating piece 6, while the outer edge thereof is fixed with the circuit board 8 and is electrically connected with the protection circuit module, thereby forming a structure in which the second battery cathode 32 protrudes outwards from the second battery anode 22, or, the second battery anode 22 is sunken inwards relative to the second battery cathode 32, and the meanings expressed by the two statements are the same. The structure in which the second battery anode 22 is sunken inwards ensures that when a common charger is used for charging, a cathode interface of the charger will not be in contact with the second battery anode 22 by mistake. In other implementations, the circuit board can also be fixed at the first end of the battery core, rather than at the second end, the anode connecting piece, the cathode connecting piece, the first and the second battery anodes and the first and the second battery cathodes can also be electrically connected by adopting other ways, which are not limited herein.

The anode connecting piece 41 is fixed along the outer side of the battery core, and includes a first end and a second end; the first end of the anode connecting piece 41 is fixed between the first battery anode 21 and the core anode 11, such that the first battery anode 21 is electrically connected with the core anode 11; the insulating base 7 is provided with a through hole (not shown in the figure), the second end of the anode connecting piece 41 penetrates the through hole on the insulating base 7, is fixed with the circuit board 8 and is electrically connected with the EB+ port of the protection circuit module, and the second battery anode 22 is electrically connected with the EB+ port of the protection circuit module on the circuit board 8.

The cathode connecting piece 42 is fixed along the outer side of the battery core and includes a first end and a second end; the first end of the cathode connecting piece 42 is fixed between the first battery cathode 31 and the step, and is electrically connected with the first battery cathode 31; the second end of the cathode connecting piece 42 is fixed with the circuit board 8 and is electrically connected with the EB− port of the protection circuit module. The second battery cathode 32 is electrically connected with the EB− port of the protection circuit module.

The insulating sleeve 9 is arranged outside the battery core, the anode connecting piece 41 and the cathode connecting piece 42 in a sheathing manner, and the two ends of the insulating sleeve are open, so as to expose the first battery anode 21, the second battery anode 22, the first battery cathode 31 and the second battery cathode 32.

Figure 2:
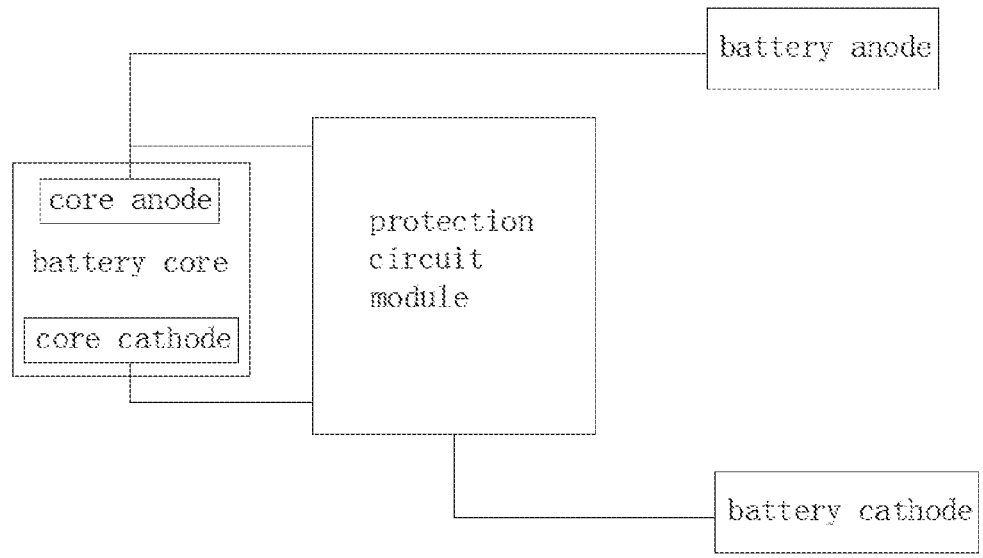
FIG. 2 is a circuit block diagram of a battery capable of bidirectional output in a first embodiment of the present invention.

The circuit board 8 is provided with a protection circuit module. Please refer to FIG. 2. The protection circuit module is connected between the battery anode and the battery cathode to control the on and off of the electrical connection between the battery anode and the battery cathode. Every two of the battery anode, the core anode 11 and the protection circuit module are mutually electrically connected, and the battery cathode, the protection circuit module and the core cathode 12 are electrically connected in a successive order. In other implementations, the solution in a second embodiment can also be adopted: the battery anode, the protection circuit module and the core anode 11 are electrically connected in a successive order, and every two of the battery cathode, the core cathode 12 and the protection circuit module are mutually electrically connected, and for specific details, please refer to a second embodiment below.

Figure 3:
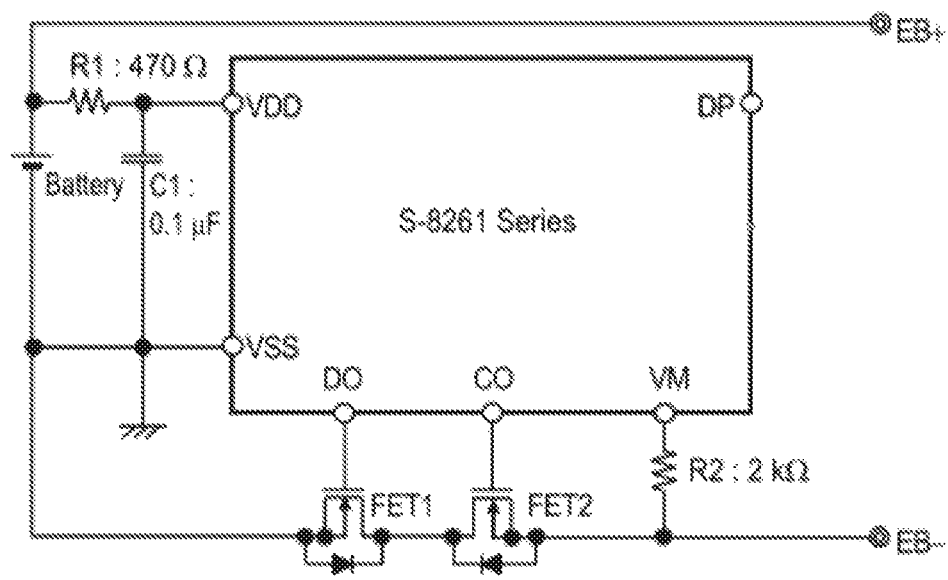
FIG. 3 is a circuit diagram of a battery capable of bidirectional output in a first embodiment of the present invention.

Specifically, please refer to FIG. 3, the protection circuit module includes a first chip C1, a first resistor R1, a second resistor R2, a first capacitor C1, a first field effect transistor FET1, a second field effect transistor FET2, an EB+ port and an EB− port. The first chip is an S-8261 Series chip, and a VDD pin thereof is respectively electrically connected with a first end of the first resistor R1 and a first end of the first capacitor C1, a second end of the first resistor R1 is respectively electrically connected with the EB+ port and the core anode (the battery core refers to the "Battery" sign in the figure), the core cathode 12 is respectively electrically connected with the EB− port and the VSS pin of the first chip, and the core cathode 12 and the second end of the first capacitor are both grounded; a DO pin of the first chip is electrically connected with a gate terminal of the first field effect transistor FET1, a CO pin thereof is electrically connected with a gate terminal of the second field effect transistor FET2, and a VW pin thereof is electrically connected with the first end of the second resistor R2; a source terminal of the first field effect transistor FET1 is connected with the core cathode 12, and the drain terminal thereof is connected with the drain terminal of the second field effect transistor FET2; a source terminal of the second field effect transistor FET2 and a second end of the second resistor R2 are electrically connected, and they are both electrically connected with the EB− port; the EB+ port is respectively electrically connected with the first battery anode 21 and the second battery anode 22, and the EB− port is respectively electrically connected with the first battery cathode 31 and the second battery cathode 32.

Wherein voltage values are input via a VDD pin and a VSS pin of the first chip, after calculation, feedback signals are sent by the pins DO and CO, and then the on and off of the electrical connection between the EB− port and the core cathode 12 are controlled via the first field effect transistor FET1 and the second field effect transistor FET2. When the charging voltage of the battery is overly high, or the discharge voltage of the battery is too low, the DO and CO output a low level, the source and the drain terminal of the first field effect transistor FET1 are disconnected, and the source and the drain terminal of the second field effect transistor FET2 are disconnected, such that the electrical connection between the EB− port and the core cathode is disconnected, and further the electrical connection between the EB+ port and the EB− port is disconnected, the battery capable of bidirectional output stops operating, thereby realizing the functions of overvoltage protection during charging and low-voltage protection during discharge.

Signals are input to the first chip via a VM pin, the first chip calculates the current values output by the EB+ port and the EB− port, when the discharge current of the battery is overly high, DO and CO output a low level, the source and the drain terminal of the first field effect transistor FET1 are disconnected, and the source and the drain terminal of the second field effect transistor FET2 are disconnected, such that the electrical connection between the EB− port and the core cathode is disconnected, and further the electrical connection between the EB+ port and the EB− port is disconnected, and the battery capable of bidirectional output stops operating, thereby realizing the function of overcurrent protection during discharge.

Meanwhile, the first chip is internally provided with a temperature probe, and a temperature protection value can be set. When the temperature exceeds a critical value, DO and CO output a low level, the source and the drain terminal of the first field effect transistor FET1 are disconnected, and the source and the drain terminal of the second field effect transistor FET2 are disconnected, such that the electrical connection between the EB− port and the core cathode is disconnected, and further the electrical connection between the EB+ port and the EB− port is disconnected, and the battery capable of bidirectional output stops operating, thereby realizing the function of overtemperature protection during charging and discharge.

Figure 4:
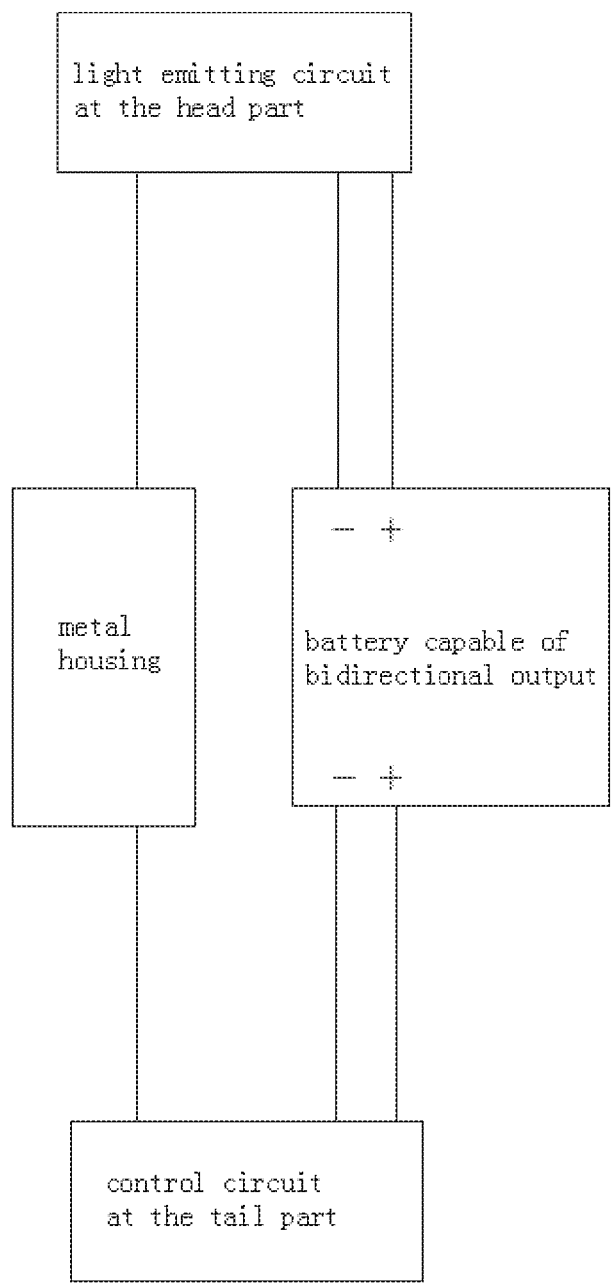
FIG. 4 is a circuit block diagram of a battery capable of bidirectional output in a first embodiment of the present invention when the battery is applied in a flashlight.

Please refer to FIG. 4 which is a circuit block diagram of a battery capable of bidirectional output in a first embodiment of the present invention when the battery is applied in a flashlight with a metal housing. A head part of the flashlight is provided with a light emitting circuit, and the tail part thereof is provided with a control circuit used for controlling the light emitting circuit. The control circuit plays the roles of detecting, controlling and charging, etc. The battery anode and cathode at two ends of the battery capable of bidirectional output are electrically connected with the light emitting circuit at the head part and the control circuit at the tail part, so as to realize the functions of power supply and charging. Compared with the prior art in which the control circuit at the tail part can only be connected with the battery cathode, the functions realized in the prior art are limited, the control circuit at the tail part of a flashlight using the battery capable of bidirectional output in a first embodiment of the present invention can be connected with both the anode and the cathode of the battery, thereby realizing more detection and control functions, moreover, the battery capable of bidirectional output can be directly charged in the flashlight, and can also be detached from the flashlight and charged by a common charger, therefore, the use is convenient.

Embodiment 2

A second embodiment is basically the same as the first embodiment, with the major difference being as follows: a battery anode, a protection circuit module and a core anode are electrically connected in a successive order, every two of the battery cathode, the core cathode and the protection circuit module are mutually electrically connected. The principle of such a solution is the same as that in the first embodiment, and the difference is only as follows: in the first embodiment, an on-off switch (the on-off switch is realized via the protection circuit module, and is specifically realized via a first chip and two field effect transistors in the protection circuit module) is arranged between a battery cathode and a core cathode, and is further disconnected when necessary to control the battery capable of bidirectional output to stop operating, while in the second embodiment, an on-off switch is arranged between the battery anode and a core anode, and is further disconnected when necessary to control the battery capable of bidirectional output to stop operating. At this time, the first battery anode and the second battery anode are respectively electrically connected with the protection circuit module, and the protection circuit module is electrically connected with the core anode; and the first battery cathode and the second battery cathode are respectively electrically connected with the core cathode.

Specifically, the circuit board can be arranged at a first end or a second end of the battery core, the second end is selected in the present embodiment, and correspondingly, the positions of the first insulating piece, the second insulating piece, the insulating base and the insulating sleeve are the same as those in the first embodiment, and the anode connecting piece and the cathode connecting piece are also respectively fixed along the outer side of the battery core. The difference lies in that, the first battery anode is electrically connected with the protection circuit module via the anode connecting piece, the second battery anode is electrically connected with the protection circuit module, and the protection circuit module is electrically connected with the core anode via the anode connecting piece; and the first battery cathode is electrically connected with the core cathode via the cathode connecting piece, and the second battery cathode is electrically connected with the core cathode.

For the battery capable of bidirectional output in embodiments of the present invention, the two ends of the battery are both provided with a battery anode and a battery cathode respectively, such that any end of the battery can provide an anode output terminal and a cathode output terminal simultaneously, circuit wiring can be optimized when use, and the first end of the battery capable of bidirectional output is provided with a first battery anode which protrudes outwards, and the second end thereof is provided with a second battery cathode which protrudes outwards, the battery in embodiments of the present invention has a structure which is similar to that of a common battery, thus the battery can be charged with a common charger (for example, the battery can be charged with a conventional charger of cylindrical lithium batteries with such models as 21700, 20700 and 18650), then short circuit is prevented, and specially designed chargers are not needed; further, a protection circuit module is arranged to control the on and off of the electrical connection between the battery anode and the battery cathode, and further to control the output of the battery anode and the battery cathode, so as to realize the functions of overvoltage protection during charging, low-voltage protection during discharge, overcurrent protection during discharge, and overtemperature protection during charging and discharge.

In the description of embodiments of the present invention, it should be noted that, the directional or positional relationship indicated by such terms as "center", "longitudinal", "transverse", "up", "down", "front", "rear", "left", "right", "vertical", "horizontal", "top", "bottom", "inner" and "outer" refers to the directional or positional relationship shown based on the accompanying drawings. Such directional or positional relationship is only for the convenience and simplicity of describing embodiments of the present invention, rather than indicating or implying that the mentioned device or element must have a specific position or must be constructed and operated in a specific position, therefore, the directional or positional relationship cannot be understood as a limitation to embodiments of the present invention. In the description of embodiments of the present invention, unless otherwise specified, the meaning of "multiple" is two or more.

For the sake of clarity, it is to be understood that the use of "a" or "an" throughout this application does not exclude a plurality, and "comprising" or "including" does not exclude other steps or elements.

Although the present invention has been disclosed in the form of preferred embodiments and variations thereon, it will be understood that numerous additional modifications and variations could be made thereto without departing from the scope of the invention.

What is claimed is:

1. A battery capable of bidirectional output, the battery comprising:
   a battery core;
   a battery anode;
   a battery cathode;
   an insulating sleeve;
   a first insulating piece;
   a second insulating piece;
   an insulating base; and
   a circuit board;
   wherein the battery core comprises a first end and a second end, an end part of the first end is provided with a core anode, and an end part of the second end is provided with a core cathode;
   wherein the insulating sleeve is arranged outside the battery core in a sheathing manner, and two ends of the insulating sleeve are open;
   wherein the battery anode comprises a first battery anode and a second battery anode, and the battery cathode comprises a first battery cathode and a second battery cathode, further wherein the first battery anode and the first battery cathode are located at the first end of the battery core, and the second battery anode and the second battery cathode are located at the second end of the battery core;
   wherein the battery anode is electrically connected with the core anode, and the battery cathode is electrically connected with the core cathode;
   wherein the first battery anode protrudes outwards with respect to the first battery cathode, and the second battery cathode protrudes outwards with respect to the second battery anode;
   wherein the first insulating piece is fixed with the first battery anode and the first battery cathode respectively in order to isolate and insulate the first battery anode and the first battery cathode, and also to enable the first battery anode to protrude outwards with respect to the first battery cathode;
   wherein the insulating base is fixed below the core cathode, and is fixed with the second battery anode; and the second insulating piece is fixed with the second battery anode and the second battery cathode respectively in order to isolate and insulate the second battery anode and the second battery cathode, and also to enable the second battery cathode to protrude outwards with respect to the second battery anode;
   wherein the circuit board is provided with a protection circuit module, and the protection circuit module is connected between the battery anode and the battery cathode to control on and off of an electrical connection between the battery anode and the battery cathode; the battery anode, the protection circuit module and the core anode are electrically connected in a successive order, every two of the battery cathode, the core cathode and the protection circuit module are mutually electrically connected, or, every two of the battery anode, the core anode and the protection circuit module are mutually electrically connected, and the battery cathode, the protection circuit module and the core cathode are electrically connected in a successive order.

2. The battery capable of bidirectional output of claim 1, wherein center of the first battery cathode is provided with a through hole, the first battery anode is located on an axis of the through hole of the first battery cathode, and protrudes outwards with respect to the first battery cathode; and center of the second battery cathode is provided with a through hole, the second battery anode is located on an axis of the through hole of the second battery cathode, and is sunken with respect to the second battery cathode.

3. The battery capable of bidirectional output of claim 2, wherein the first battery anode is truncated-cone-shaped or cylinder-shaped, while the first battery cathode is annular, and the second battery anode is a round piece, the second battery cathode is annular.

4. The battery capable of bidirectional output of claim 1, further comprises an anode connecting piece and a cathode connecting piece which are fixed along an outer side of the battery core respectively, wherein the circuit board is fixed at a second end of the battery core; the first battery anode is electrically connected with the core anode, and the second battery anode is electrically connected with the core anode via the anode connecting piece; and the first battery cathode is electrically connected with the protection circuit module via the cathode connecting piece, the second battery cathode is electrically connected with the protection circuit module, and the protection circuit module is electrically connected with the core cathode.

5. The battery capable of bidirectional output of claim 4, wherein the first battery anode is a truncated-cone-shaped or cylinder-shaped protrusion, and is fixed above the core anode; the annular first insulating piece is arranged outside the first battery anode in a sheathing manner, and an outer edge of the first insulating piece is provided with a sunken step; the first battery cathode is a annular piece, and is arranged on the step in a covering manner, such that the first battery cathode is lower than the first battery anode; a first end of the anode connecting piece is fixed between the first battery anode and the core anode, such that the first battery anode is electrically connected with the core anode; and a first end of the cathode connecting piece is fixed between the first battery cathode and the step.

6. The battery capable of bidirectional output of claim 4, wherein the second battery anode is a round piece, and is fixed in center below the insulating base; the circuit board is a annular piece, and is fixed below the insulating base, wherein outer edge of the circuit board is fixed with the insulating base, while inner edge of the circuit board is fixed with the second battery anode to enable the second battery anode to be electrically connected with the protection circuit module; the second insulating piece is annular, and is fixed below the second battery anode and the circuit board, the through hole in center of the second insulating piece leads to a bottom surface of the second battery anode, so as to expose the second battery anode; the second battery cathode is a annular piece, inner edge of the second battery cathode is fixed with the second insulating piece, while outer edge of the second battery cathode is fixed with the circuit board and is electrically connected with the protection circuit module; the insulating base is provided with a through hole, a second end of the anode connecting piece penetrates the through hole on the insulating base, is fixed with the circuit board and is electrically connected with the protection circuit module; and a second end of the cathode connecting piece penetrates the through hole on the insulating base, is fixed with the circuit board, and is electrically connected with the protection circuit module.

7. The battery capable of bidirectional output of claim 1, wherein the protection circuit module comprises a first chip, a first resistor, a second resistor, a first capacitor, a first field effect transistor, a second field effect transistor, an EB+ port and an EB− port; wherein the first chip is an S-8261 Series chip, and a VDD pin of the first chip is electrically connected with a first end of the first resistor and a first end of the first capacitor respectively, a second end of the first resistor is electrically connected with the EB+ port and the core anode respectively, the core cathode is electrically connected with the EB− port and the VSS pin of the first chip respectively, and the core cathode and a second end of the first capacitor are both grounded; a DO pin of the first chip is electrically connected with a gate terminal of the first field effect transistor, a CO pin of the first chip is electrically connected with a gate terminal of the second field effect transistor, and a VW pin of the first chip is electrically connected with a first end of the second resistor; a source terminal of the first field effect transistor is connected with the core cathode, and a drain terminal of the first field effect transistor is connected with a drain terminal of the second field effect transistor; a source terminal of the second field effect transistor and a second end of the second resistor are electrically connected, and they are both electrically connected with the EB− port; the EB+ port is electrically connected with the first battery anode and the second battery anode respectively, and the EB− port is electrically connected with the first battery cathode and the second battery cathode respectively; and the battery core is a 21700 battery core.

8. The battery capable of bidirectional output of claim 4, wherein the protection circuit module comprises a first chip, a first resistor, a second resistor, a first capacitor, a first field effect transistor, a second field effect transistor, an EB+ port and an EB− port; wherein the first chip is an S-8261 Series chip, and a VDD pin of the first chip is electrically connected with a first end of the first resistor and a first end of the first capacitor respectively, a second end of the first resistor is electrically connected with the EB+ port and the core anode respectively, the core cathode is electrically connected with the EB− port and the VSS pin of the first chip respectively, and the core cathode and a second end of the first capacitor are both grounded; a DO pin of the first chip is electrically connected with a gate terminal of the first field effect transistor, a CO pin of the first chip is electrically connected with a gate terminal of the second field effect transistor, and a VW pin of the first chip is electrically connected with a first end of the second resistor; a source terminal of the first field effect transistor is connected with the core cathode, and a drain terminal of the first field effect transistor is connected with a drain terminal of the second field effect transistor; a source terminal of the second field effect transistor and a second end of the second resistor are electrically connected, and they are both electrically connected with the EB− port; the EB+ port is electrically connected with the first battery anode and the second battery anode respectively, and the EB− port is electrically connected with the first battery cathode and the second battery cathode respectively; and the battery core is a 21700 battery core.

9. The battery capable of bidirectional output of claim 5, wherein the protection circuit module comprises a first chip, a first resistor, a second resistor, a first capacitor, a first field effect transistor, a second field effect transistor, an EB+ port and an EB− port; wherein the first chip is an S-8261 Series chip, and a VDD pin of the first chip is electrically connected with a first end of the first resistor and a first end of the first capacitor respectively, a second end of the first resistor is electrically connected with the EB+ port and the core anode respectively, the core cathode is electrically connected with the EB− port and the VSS pin of the first chip respectively, and the core cathode and a second end of the first capacitor are both grounded; a DO pin of the first chip is electrically connected with a gate terminal of the first field effect transistor, a CO pin of the first chip is electrically connected with a gate terminal of the second field effect transistor, and a VW pin of the first chip is electrically connected with a first end of the second resistor; a source terminal of the first field effect transistor is connected with the core cathode, and a drain terminal of the first field effect transistor is connected with a drain terminal of the second field effect transistor; a source terminal of the second field effect transistor and a second end of the second resistor are electrically connected, and they are both electrically connected with the EB− port; the EB+ port is electrically connected with the first battery anode and the second battery anode respectively, and the EB− port is electrically connected with the first battery cathode and the second battery cathode respectively; and the battery core is a 21700 battery core.

10. The battery capable of bidirectional output of claim 6, wherein the protection circuit module comprises a first chip, a first resistor, a second resistor, a first capacitor, a first field effect transistor, a second field effect transistor, an EB+ port and an EB− port; wherein the first chip is an S-8261 Series chip, and a VDD pin of the first chip is electrically connected with a first end of the first resistor and a first end of the first capacitor respectively, a second end of the first resistor is electrically connected with the EB+ port and the core anode respectively, the core cathode is electrically connected with the EB− port and the VSS pin of the first chip respectively, and the core cathode and a second end of the first capacitor are both grounded; a DO pin of the first chip is electrically connected with a gate terminal of the first field effect transistor, a CO pin of the first chip is electrically connected with a gate terminal of the second field effect transistor, and a VW pin of the first chip is electrically connected with a first end of the second resistor; a source terminal of the first field effect transistor is connected with the core cathode, and a drain terminal of the first field effect transistor is connected with a drain terminal of the second field effect transistor; a source terminal of the second field effect transistor and a second end of the second resistor are electrically connected, and they are both electrically connected with the EB− port; the EB+ port is electrically connected with the first battery anode and the second battery anode respectively, and the EB− port is electrically connected with the first battery cathode and the second battery cathode respectively; and the battery core is a 21700 battery core.

\* \* \* \* \*